Nov. 14, 1961  G. A. BRONSON  3,008,377
BOMB CARRIAGE AND RELEASE DEVICE
Filed June 17, 1958  3 Sheets-Sheet 1
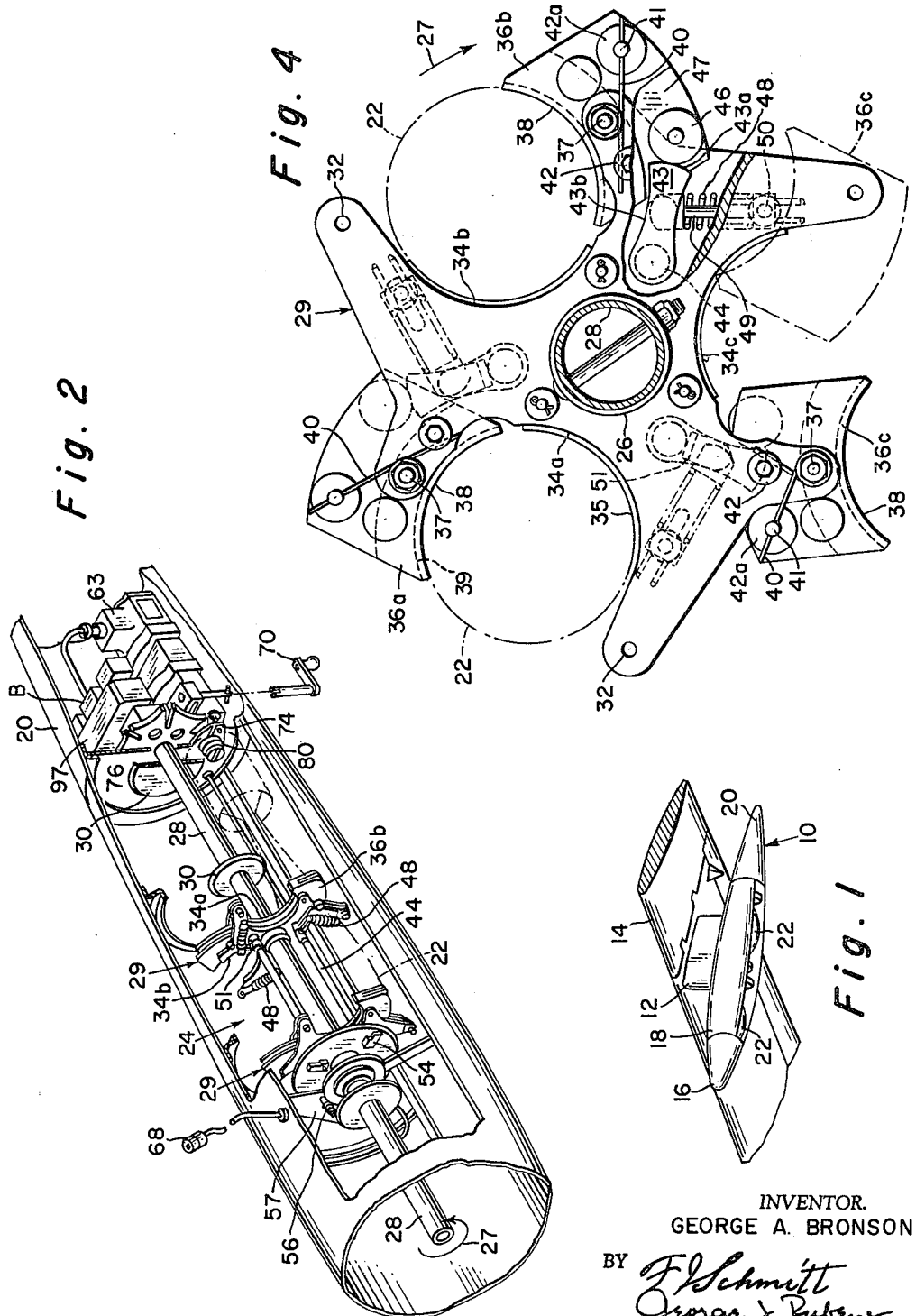
INVENTOR.
GEORGE A. BRONSON
BY
ATTORNEYS Nov. 14, 1961    G. A. BRONSON    3,008,377
BOMB CARRIAGE AND RELEASE DEVICE
Filed June 17, 1958    3 Sheets-Sheet 2

INVENTOR.
GEORGE A. BRONSON
BY F J Schmitt
George J Rubens
ATTORNEYS

Nov. 14, 1961 G. A. BRONSON 3,008,377
BOMB CARRIAGE AND RELEASE DEVICE
Filed June 17, 1958 3 Sheets-Sheet 3
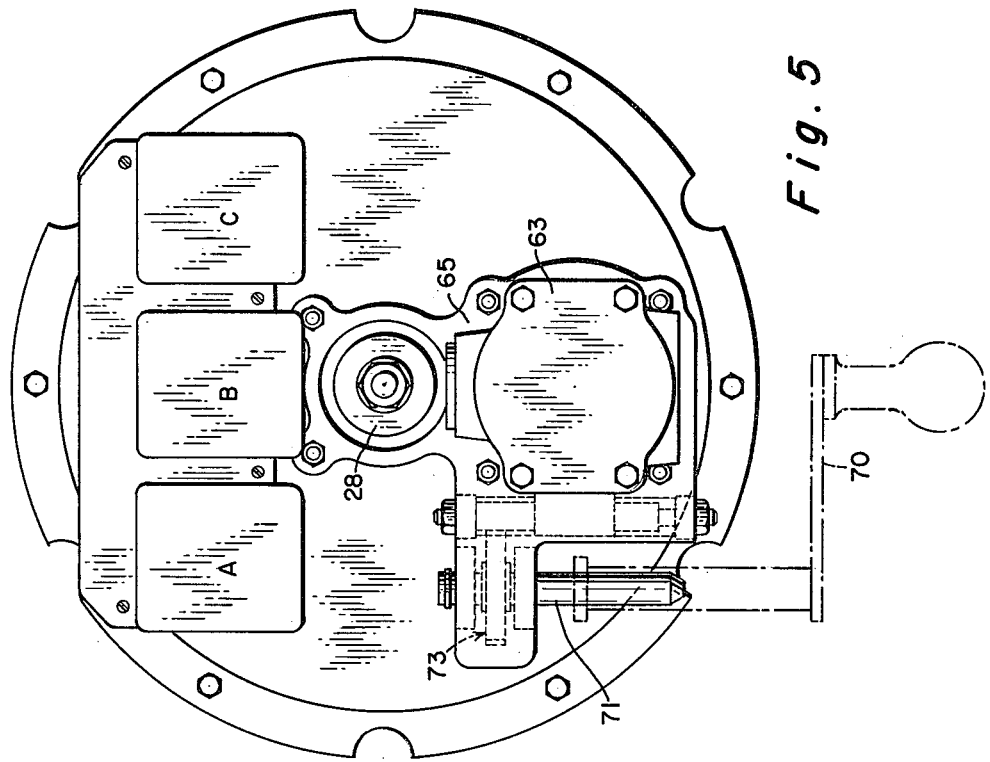
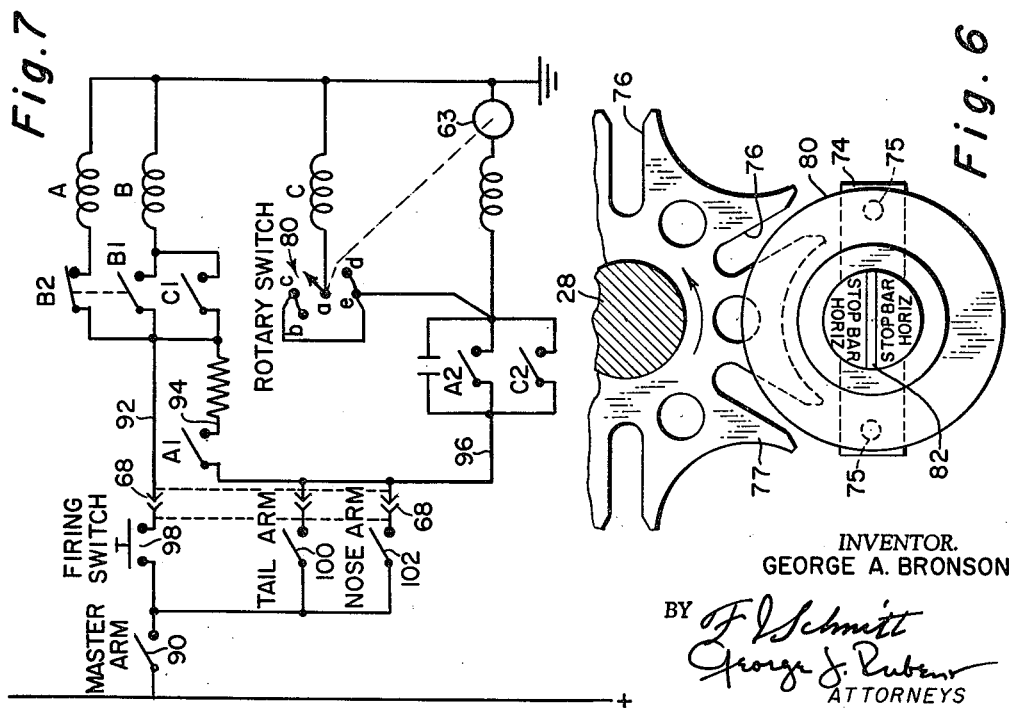
INVENTOR.
GEORGE A. BRONSON
BY
ATTORNEYS

United States Patent Office 3,008,377
Patented Nov. 14, 1961

3,008,377
BOMB CARRIAGE AND RELEASE DEVICE
George A. Bronson, Lynwood, Calif., assignor, by mesne assignments, to the United States of America as represented by the Secretary of the Navy
Filed June 17, 1958, Ser. No. 742,695
4 Claims. (Cl. 89—1.5)

This invention relates to bomb carrying and release devices for aircraft, and more particularly to such a device suitable for carrying practice bombs and controlled by an electrical circuit capable of effecting a high speed discharge of each bomb independent of the length of the applied electrical release impulse.

The advent of high speed aircraft has introduced a requirement for a corresponding high speed release mechanism for various projectiles, for example, MK76 practice bombs and MK15 depth charges. In one installation the high speed requirement can be expressed in the order of about 100 milliseconds for the complete operation of a single projectile release including starting, rotation, and stopping of the release mechanism. On carrier based aircraft the release mechanism must be capable of withstanding catapult and arresting loads without inadvertent release of the bombs. Bombs should be ejectable during a 45 degree climb or dive at air speeds of 450 miles per hour and higher.

According to the present invention the bombs are supported by one or more rotatable carriages in tandem housed in a low drag aerodynamic container having an opening through which the bombs are dropped. The container is detachably suspended from a conventional bomb rack on the launching aircraft. The bombs are circumferentially spaced around each carriage about a central drive shaft, the projectiles on one carriage circumferentially staggered with respect to the projectiles of another carriage. A spring-loaded mechanism is provided for latching and releasing each bomb one at a time upon a predetermined increment of shaft rotation. The carriages and integral drive shaft are driven by a high speed electric drive mechanism during airborne drop operations, or a manual crank for ground loading and checking operations. The motor and drive mechanism rotate only during a bomb release operation. Controlled stopping is accomplished by a rotary switch driven by the motor and a plurality of suitably arranged relays. The drive mechanism includes means for indexing the movement of the shaft in accordance with the required degree of rotation for each bomb release.

A principal object of this invention is to provide a bomb carrying and release device capable of high speed operation.

A further object is to provide a control circuit for such device that will positively and successively release each bomb independently of the length of the operator's releasing impulse.

Still another object is to provide a release mechanism for said bombs capable of being housed in a low drag aerodynamic container that can be attached to an exterior or interior section of a launching aircraft.

Other objects and many of the attendant advantages of this invention will be readily appreciated as the same becomes better understood by reference to the following detailed description when considered in connection with the accompanying drawings wherein:

FIG. 1 is a bottom isometric view of the bomb carrying and release device of this invention suspended by a pylon from an aircraft wing;

FIG. 2 is a partial isometric view with a portion of the device cutaway to show the arrangement of one of the two bomb-supporting carriages;

FIG. 4 is a transverse section taken along lines IV—IV of FIG. 3;

FIG. 5 is an aft view of the device showing the manual drive mechanism;

FIG. 6 is a partial front elevation view of the rotary switch and Geneva mechanism; and FIG. 7 is a schematic electrical diagram of the drive motor control circuit.

Figure 3:
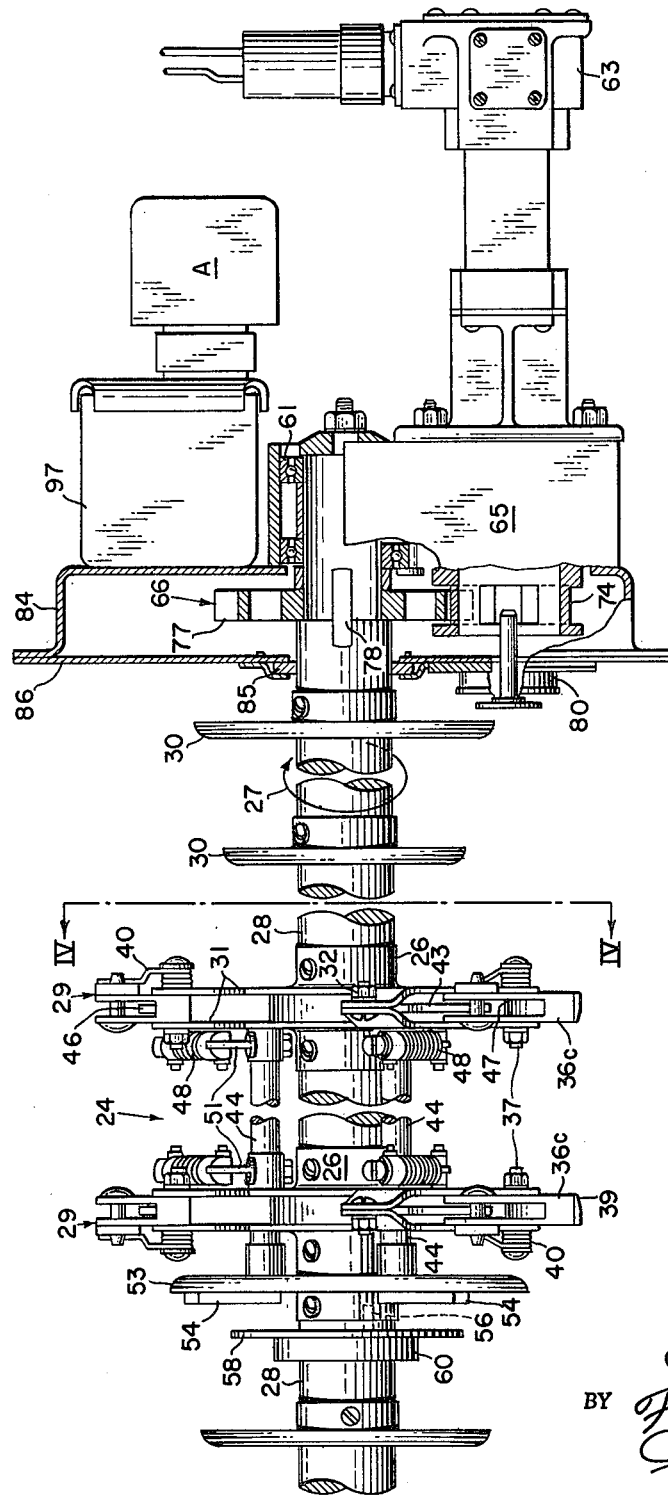
FIG. 3 is an enlarged elevation view of one of the release carriages shown in FIG. 2.

Referring to the drawing where like reference numerals refer to similar parts throughout the figures, there is shown in FIG. 1 a bomb or projectile carrying and release device 10 suspended by suitable lugs (not shown) from a conventional bomb rack pylon 12 on a foldable aircraft wing 14, the device being incorporated in this embodiment as a practice bomb container. The container comprises a nose cone 16 providing a minimum aerodynamic drag; an open-bottom center section 18 for housing the bomb carriage and ejector mechanism; and a tail cone 20 for housing the drive mechanism. The nose and tail cones are detachably secured to the center section and can be removed for installation in the bomb bay of an aircraft.

In the illustrated embodiment, six practice bombs 22 are supported by a pair of longitudinally disposed carriages 24, three bombs being circumferentially arranged on each carriage. The carriages are pinned by integral hub collars 26 to a shaft 28 that extends substantially the length of the container, the shaft being a part of a drive mechanism later to be described, which rotates the shaft in the direction of arrow 27. The groups of three bombs on the fore and aft carriages, respectively, are angularly staggered about the shaft so that successively and alternately dropped bombs from the two carriages are 60 degrees apart. Each carriage comprises a pair of spaced sprockets 29 between which the bomb body is supported, the bomb fins being laterally restrained between a pair of spaced thrust collars 30 fixed on the shaft.

Each sprocket 29 is identical in construction, the two corresponding sprockets of each carriage being arranged as mirror images, and thus a description of one sprocket and components should suffice for the others bearing in mind that the two sprockets operate in unison on the bombs supported therebetween. Each sprocket comprises two spaced plates 31 intermittently secured together at 32 between which are formed three semicylindrical peripheral recesses 34a, 34b, 34c having concave seats 35 for supporting the respective bombs. Each bomb-holding recess is provided with a corresponding ejector 36a, 36b, 36c each being centrally pivoted in the space between plates 31 on a pin 37 extending therebetween. Each ejector has a concave bomb-engaging recess 38 corresponding to the curvature of the adjacent seat 35, the ejectors being laterally disposed therefrom so that the respective faces of the recesses are coterminous in the closed position of the ejector (see 36a in FIG. 4). The concave faces of the ejectors and seats are bevelled at 39 (FIG. 3) to conform to the bomb surface. In the closed position, the combined surface of recess 38 and seat 35 encompass more than 180 degrees of the bomb surface to latch it within the carriage until the release position is reached adjacent discharge opening in container 10 (FIG. 1).

Each ejector is spring-biased to a release position, (see ejector 36c in FIG. 4) by a looped spring 40 having one end fixed to the ejector by pin 41 and the other end anchored at 42 to the sprocket, the central portion of the spring being wound around pin 37. Each ejector is retained in the closed position by a latch mechanism until the respective bomb reaches the release position. The ejector is limited in the released position by a disc 42a concentric with pin 41 and adapted to abut on the plates 31.

The latch mechanism (FIGS. 3 and 4) comprises a latch arm 43 mounted to the end of a trip rod 44, the corresponding latch arms of the two sprockets of each carriage being mounted on a common trip rod journaled to and extending between the sprockets. As best shown in FIG. 4, the free end of latch arm 43 is provided with two cam surfaces 43a and 43b adapted to alternately engage a roller 46 pinned in a slotted portion 47 of each ejector (opposite recessed portion 38). When roller 46 engages end surface 43a, the latch functions as a stop to lock the ejector closed in a bomb-securing position. Latch arm 43 is maintained in the path of ejector abutting the base of slotted portion 47 by the force of a trip compression spring 48 which restrains the rotation of trip rod 44 until actuated by the drive mechanism through an indexing means to be explained. Trip spring 48 is mounted around a guide 49 keyed at one end to the carriage by a pin 50 and to the other end to the trip rod by an eye bolt 51 providing a pivotal connection. Rotation of rod 44 (clockwise in FIG. 4) when the release position is indexed, rotates latch arm 43 to compress spring 48 until roller 46 rides off cam surface 43a onto side surface 43b of the latch arm freeing the ejector to discharge the bomb under the action of springs 40 and 48.

Rotation of each rod 44 is affected by an extending portion journaled in a collar 53 fixed to shaft 28, the rod terminating in a trip arm 54 which rocks the corresponding rod at the predetermined release position to trip the ejector and release the bomb. The three trip arms on each carriage are successively actuated in alternate cycles with the other carriage, by a corresponding trip pin 56 mounted on a strap 57 (FIG. 2) secured at one end to a support plate 58 and at the other end ring-shaped bulkhead 59 of the container frame. Pin 56 is circumferentially positioned about 90 degrees before the discharge opening in the container (FIG. 2) and longitudinally extends into the path of the arms to trip them through an acute angle as they successively pass the fixed position of the pin.

As previously stated, shaft 28 extends longitudinally substantially the length of both bomb bays, the shaft being supported at an intermediate position by a bearing 60 supported on plate 58 and end bearings 61, one being illustrated in FIG. 3 adjacent the drive mechanism.

Shaft 28 is driven by an electric rotary actuator 63 through a planetary reduction gear box 65, and a Geneva drive mechanism 66. One type of rotary actuator found suitable is a Type D506 manufactured by the Electrical Engineering and Manufacturing Corporation, having an integral magnetic clutch and brake, a loaded speed of 15000 r.p.m., and developing 7½ amps. at 28 volt D.-C. power supplied from the launching aircraft by a plug 68 which also provides a power supply for an electrical control circuit in FIG. 7.

A manual drive assembly (FIGS. 3 and 5) accessible from beneath the container is provided to rotate drive shaft 28 for ground loading and test operations. A detachable handcrank 70 can be inserted through an opening in the bottom end of the container tail section and engages a handcrank shaft 71 connected to a worm and wormwheel assembly 73 through which the main shaft is driven. About 14 turns of handcrank 70 are required to rotate the mechanism through one sixty degree ejection cycle, the same movement being obtained through one pulse of a firing switch in a manner to be described.

Geneva mechanism 66 functions to index drive shaft 28 to each of the six bomb release positions spaced sixty degrees apart. As shown in FIG. 6, the mechanism comprises a Geneva driver 74 connected to the output of planetary gear box 65, the driver having a pair of oppositely disposed pins 75 adapted successively to engage six corresponding slots 76 in a Geneva wheel 77 to provide an intermittent drive, as is well known in the art. Each 180 degree movement of driver 74 rotates Geneva wheel 77 one cycle, i.e., 60 degrees. Geneva wheel 77 is keyed to shaft 28 at 78 (FIG. 3). A rotary switch 80 is mounted forward of and keyed to the Geneva driver 74. A straight line 82 (FIG. 6) is painted on the face of the switch in line with the pins 75 to provide an indication of the horizontal position of the driver for loading purposes. Rotary switch 80 and a Geneva wheel cover pan 84 are supported to compartment wall 86 through which shaft 28 extends sealed at 85.

Operation of a bomb release and ejection cycle will be described after the following description of the electrical control circuit.

A schematic electrical diagram is shown in FIG. 7 wherein all switches are shown in a non-actuated position prior to a firing operation. The circuit includes a master armament switch 90 in series with the power source and three parallel lines 92, 94, and 96 containing a firing button switch 98, a tail arming switch 100, and a nose arming switch 102, respectively. Master armament switch 90, firing switch 98, tail arming switch 100, and nose arming switch 102 are located in the cockpit, the firing switch 98 being a push button mounted on the pilot's control stick. Drive motor 63 and associated winding is connected in line 96 to switches 100 and 102.

Three relays, motor starting relay A, rotation limit relay B, and rotation control relay C are connected in parallel with lines 92, 94, and 96, respectively, one end of each relay and motor 63 being grounded by return line 98 connected to bomb rack lugs (not shown). Said relays are mounted on a circuit assembly box 97 in the tail section of the container, as shown in FIGS. 2 and 5. Each relay is provided with a pair of switches having designation referring to the respective relays, namely, A1, A2, B1, B2, and C1, C2, the switches in each pair being ganged together. Switch B2 is the only switch normally closed.

Line 92 contains a motor starting branch containing normally closed switch B2 and relay A connected in series. A rotation selector branch line contains normally open switch B1 and relay B, while a third parallel circuit contains a normally open switch C1. Motor drive circuit in line 96 contains a parallel circuit of normally open switches A2 and C2, the former being actuated by motor starting relay A.

Rotary switch 80 has a contact arm 80a mechanically driven by motor 63 and electrically connected in series with rotation control relay C. Switch 80 has two pair of contacts b, c, and d, e, the contacts in each pair being jumped, and both pairs of contacts being connected to the motor drive circuit in line 96. Switch arm 80a is rotated 180 degrees for every 60 degree rotation of drive shaft 28, being the operation of one release cycle. Line 96 is connected to holding line 94 through a normally open switch A1.

Operation of the motor control circuit is as follows. With master arm switch 90, tail arm switch 100, and nose arm switch 102 closed, depression of firing button 98 by the pilot energizes relay A, through normally closed switch B2, closing holding switch A1 and switch A2, the latter completing the circuit to drive motor 63 which commences rotation. It should be noted that switch A1 holds relay A energized through line 94 permitting the pilot instantly to release firing button after a single drop. Rotary switch arm 80a is rotated by the drive motor in the direction of the arrow. When arm 80a engages contact d, rotation control relay C is energized to close both of its switches C1 and C2, the latter in readiness to control motor operation. Closing of switch C1 simultaneously energizes rotation selector relay B which shifts control of drive motor operation from the starting circuit in line 92 to control of relay C in the following sequence.

Energization of relay B opens switch A2 (motor continues operation through closed switch C2) by de-energizing relay A through opening of switch B2. Immediately after motor control has shifted to energized relay C, opening of A1 de-energizes relay B restoring switch B2 to the normally closed position in readiness for start of the next cycle. Motor 63 continues to operate under control of relay C until rotary switch arm 80a rides off contact e at which time relay C is de-energized, opening switch C2 to stop motor 63. A cycle has been completed in which drive shaft 28 has been driven 60 degrees through the Geneva drive mechanism to release one bomb.

If firing button 98 is depressed when relay C is de-energized, motor 63 will continue to rotate (without stopping) into the next cycle repeating the afore-described operation. However, it should be noted that bomb release is accomplished independent of the length of the pilot's firing impulse.

In the above described preferred embodiment of the electrical circuit motor 63 is energized only during a bomb release cycle, however, it is obvious that the motor could be operated continuously and motor output controlled through an electrically controlled clutch.

Having described how the electrical control of drive motor 63 rotates drive shaft 28 one cycle of 60 degrees rotation to release a bomb by ejector 36c (FIG. 4), a description of the mechanical release operation is as follows with reference to FIGS. 2, 3, and 4.

Rotation of motor 63 drives Geneva driver 74 through reduction gearing 65, which in turn intermittently rotates Geneva wheel 77 and shaft 28, a 180 degree rotation of driver 74 rotating the wheel and shaft 60 degrees (and rotating rotary switch 180 degrees). Rotation of shaft, in direction of arrow 27, carries the two bomb carriages 24 clockwise. Since bombs are alternately released from the two carriages, the release of the corresponding bomb from the opened ejector 36c in the aft carriage (FIG. 4) will be used to described one cycle of operation. It should be noted, that at the start of this cycle, ejector 36c was in the broken-line closed position in FIG. 4, 60 degrees behind the solid-line bomb released position, having been moved from the position now occupied by ejector 36b by the operation of the previous cycle of the other.

As shaft 28 rotates, trip arm 54 corresponding to ejector 36c engages trip pin 56 rotating the associated trip rod 44 and arm 43 compressing spring 48 until roller 46 rides off surface 43a. Roller 46 being spring biased by 40 is free to roll on to lateral surface 43b at which time trip arm 54 rides over trip pin 56. Compressed spring 48 is released pushing latch 43, roller 46, and ejector 36c before it and rapidly ejecting the bomb supported thereby. Each ejector operates in the same manner ejecting the corresponding bomb whenever the associated trip arm is tripped. The bombs are dropped alternately between the two carriages until the load of six practice bombs is exhausted.

During ground loading, each bomb is pushed by hand into the carriage rotating the respective ejector and associated latch from the released position to a latched position where each roller 46 is engaged by latch surface 43a.

This invention provides a streamlined bomb container having a release mechanism capable of releasing bombs singly within a 100 millisecond interval after the pilot's firing button is depressed. This result is accomplished by employment of a Geneva drive mechanism, rotary switch and associated relays providing quick starting, limited rotation, and quick stopping, independent of the length of the applied electrical impulse. The container is adapted for appendage to an exterior position of the aircraft or within a bomb bay.

Obviously many modifications and variations of the present invention are possible in the light of the above teachings. It is therefore to be understood that within the scope of the appended claims the invention may be practiced otherwise than as specifically described.

I claim:

1. A bomb carrying and release device comprising a rotatable carriage including a pair of spaced-apart sprockets for supporting therebetween a plurality of circumferentially disposed bombs, each sprocket having a plurality of peripherally spaced recesses, two corresponding recesses on the sprockets supporting a portion of the respective bomb seat therein, a spring-loaded bomb ejector movably mounted on each sprocket and cooperating with a corresponding recess for securing said bomb to the sprocket and for forcibly displacing said bomb from the recesses, means for latching each ejector, means for releasing each latch means at predetermined increments of carriage movement to enable successive ejection of said bombs, drive mechanism including an electric motor for rotating said carriage, means between said motor and the carriage for positioning said carriage the predetermined increments, and circuitry for starting and stopping said drive mechanism for each increment of carriage movement.

2. The device of claim 1 wherein each ejector is intermediately pivotally mounted to the carriage adjacent each carriage recess, each ejector being provided with a concave recess corresponding to and being an extension of said respective carriage recess for seating an adjacent portion of said bomb.

3. The device of claim 2 wherein said latch means comprises a rod extending between and journaled to the two sprockets, a spring loaded latch arm for each corresponding ejector fixed to said rod, said rod being rotatable by a trip pin mounted in the device to release the respective latch arm.

4. A bomb carrying and release device comprising a longitudinal aerodynamic container adapted to be suspended from an aircraft, comprising a rotatable shaft extending longitudinally the container and journaled thereto, at least two bomb carriages mounted on said shaft in tandem arrangement, each carriage including a pair of longitudinally spaced apart sprockets having peripheral recesses for supporting therebetween a plurality of circumferentially spaced bombs, corresponding recesses on the sprockets of each pair supporting a portion of the respective bomb seated therein, the bombs on one carriage being circumferentially interposed in the space between the bombs of the other carriage, a spring biased bomb ejector pivotally mounted to each sprocket adjacent each peripheral recess, each ejector having a recess conforming to the respective sprocket recess for seating an adjacent portion of the respective bomb and securing said bomb in the sprocket, means for latching each ejector in the bomb-supporting position, means for releasing each latch means successively at predetermined increments of carriage movement to enable successive ejection of said bombs, drive means for rotating said shaft, a Geneva mechanism between said motor and the carriage for indexing said carriages each of the increments of movement, and circuitry including a rotary switch for starting and stopping said drive mechanism for each increment of carriage movement.

References Cited in the file of this patent

UNITED STATES PATENTS

| 2,228,674 | Raymond | Jan. 14, 1941 |
| 2,451,476 | Darnall | Oct. 19, 1948 |
| 2,826,120 | Lang et al. | Mar. 11, 1958 |

FOREIGN PATENTS

| 277,696 | Germany | Aug. 25, 1914 |
| 579,310 | Great Britain | May 8, 1946 |
| 712,248 | Great Britain | July 21, 1954 |
| 754,331 | Great Britain | Aug. 8, 1956 |